United States Patent
Hofmann

(10) Patent No.: US 10,442,064 B2
(45) Date of Patent: Oct. 15, 2019

(54) PRESSING TOOL WITH AXIAL STROKE WORKING IN OPPOSITE DIRECTIONS

(71) Applicant: Viega Technology GmbH & Co. KG, Attendorn (DE)

(72) Inventor: Frank Hofmann, Attendorn (DE)

(73) Assignee: Viega Technology GmbH & Co. KG, Attendorn (DE)

( * ) Notice: Subject to any disclaimer, the term of this patent is extended or adjusted under 35 U.S.C. 154(b) by 903 days.

(21) Appl. No.: 14/937,176

(22) Filed: Nov. 10, 2015

(65) Prior Publication Data

US 2016/0136795 A1 May 19, 2016

(30) Foreign Application Priority Data

Nov. 13, 2014 (DE) .................. 10 2014 116 597

(51) Int. Cl.
| | |
|---|---|
| *B21D 39/04* | (2006.01) |
| *B25B 27/10* | (2006.01) |
| *F16L 13/08* | (2006.01) |
| *F16L 21/08* | (2006.01) |
| *F16L 21/00* | (2006.01) |
| *F16L 13/14* | (2006.01) |

(52) U.S. Cl.
CPC ............ *B25B 27/10* (2013.01); *B21D 39/048* (2013.01); *F16L 13/08* (2013.01); *F16L 13/141* (2013.01); *F16L 21/002* (2013.01); *F16L 21/08* (2013.01); *F16L 2013/145* (2013.01)

(58) Field of Classification Search
CPC ....... F16L 13/141; F16L 21/002; F16L 21/08; F16L 13/08; B21D 39/048; B21D 27/10
USPC .................................................. 29/243.519
See application file for complete search history.

(56) References Cited

U.S. PATENT DOCUMENTS

| | | | |
|---|---|---|---|
| 4,956,904 A | 9/1990 | Yamamoto et al. | |
| 9,334,987 B2 * | 5/2016 | Hofmann | ............ B21D 39/048 |
| 2015/0321238 A1 | 11/2015 | Hofmann | |

FOREIGN PATENT DOCUMENTS

| | | |
|---|---|---|
| DE | 102012105655 A1 | 1/2014 |
| EP | 1293273 A2 | 3/2003 |
| WO | 2014000897 A1 | 1/2014 |

* cited by examiner

*Primary Examiner* — David B Jones
(74) *Attorney, Agent, or Firm* — The Webb Law Firm

(57) ABSTRACT

A pressing tool for producing a non-detachable pipe connection, including holding means for holding the periphery of at least one first tubular or sleeve-shaped connection element and including sliding means for peripherally holding and axially displacing at least one second tubular or sleeve-shaped connection element. The sliding means is movable along a first axial operating direction towards the holding means to press two interengaging tubular or sleeve-shaped connection elements. The pressing tool easily allows pipe connections to be produced in a more flexible and efficient way in that the sliding means are movable towards the holding means along a second axial operating direction opposite the first axial operating direction to press two interengaging tubular or sleeve-shaped connection elements.

13 Claims, 11 Drawing Sheets

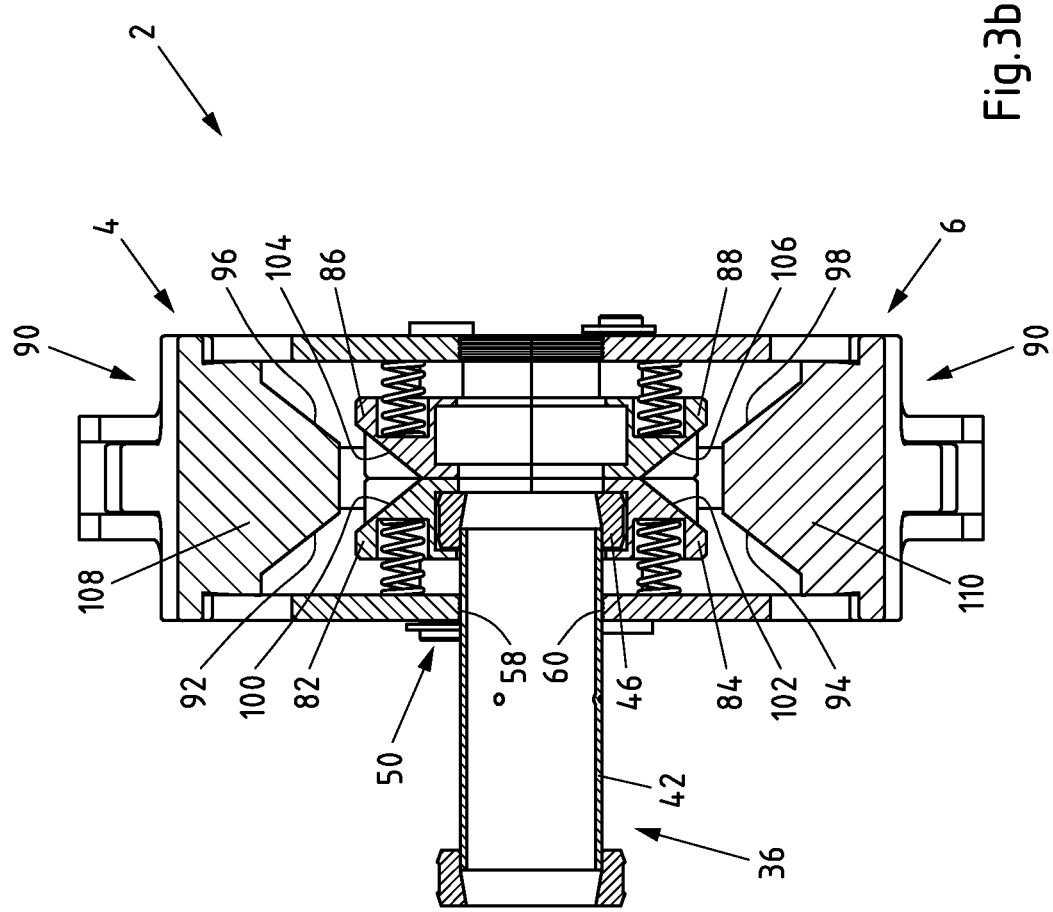

PRESSING TOOL WITH AXIAL STROKE WORKING IN OPPOSITE DIRECTIONS

CROSS-REFERENCE TO RELATED APPLICATION

This application claims priority to German Patent Application No. 10 2014 116 597.7 filed Nov. 13, 2014, the disclosure of which is hereby incorporated in its entirety by reference.

BACKGROUND OF THE INVENTION

Field of the Invention

The invention relates to a pressing tool for producing a non-detachable pipe connection comprising holding means for holding the periphery of at least one first tubular or sleeve-shaped connection element and sliding means for peripherally holding and axially moving at least one second tubular or sleeve-shaped connection element, the sliding means being movable along a first axial operating direction towards the holding means to press two interengaging tubular or sleeve-shaped connection elements. The invention also relates to a system for producing a non-detachable pipe connection using a pressing tool of this type.

Description of Related Art

Pressing tools of the type mentioned above are used during the installation of pipeline systems. In this respect, the pressing tools are used to join individual pipes or pipeline elements by means of so-called fittings. One end of a pipe which is to be joined is inserted into a fitting, which is usually also tubular or sleeve-shaped, at an end face of the fitting. Using the pressing tool, the fitting is pressed in a radial direction against the allocated end of the pipe, the pressing tool usually engaging around the periphery of the fitting and the pipe. During the pressing procedure, the fitting and pipe are plastically deformed in a radial direction and are joined together thus in an non-detachable manner.

On the one hand, pressing tools are known, by which the fitting and pipe are directly deformed in the radial direction by a narrowing of a receiving region in which the periphery of the fitting and pipe is held, the "radial direction" being oriented transversely to the longitudinal extent of the end of the pipe to be joined. On the other hand, axial joining methods are known in which two-part or multi-part fittings are usually used. In this respect, a pressing sleeve is pushed in an axial direction onto a base body of the fitting, which base body is also sleeve-shaped and surrounds the pipe end to be respectively joined, the "axial direction" being oriented along the longitudinal extent of the pipe end and thereby transversely to the pipe cross section. The diameter of the inner lateral surface of the pressing sleeve is tapered over the width of the pressing sleeve, so that when the pressing sleeve is pushed on axially, the base body of the fitting and the pipe end to be joined are narrowed radially in diameter.

DE 10 2012 105 655 A1 discloses a generic pressing tool which is provided to axially join two-part or multi-part fittings in the manner described above. The pressing tool known from this document has swivel modules which can swivel relative to one another, a receiving region for receiving a pipe and a fitting being formed between the swivel modules. A slide device serves to push a pressing sleeve onto a sleeve-shaped base body of a fitting in an axial operating direction along the receiving region, the base body being clamped or fixed in a holding device of the tool during the pressing procedure.

It is a disadvantage of the pressing tool known from DE 10 2012 105 655 A1 that the pushing movement of the pressing sleeve by the slide unit of the pressing tool is restricted axially to one operating direction. If, for example, a fitting with two opposite pressing ends is to be joined, a first pressing sleeve has to be firstly pushed onto the first pressing end of the fitting along a first operating direction. Thereafter, a second pressing sleeve has to be pushed onto the second pressing end of the fitting along a second operating direction opposite the first operating direction. Since the axial stroke of the slide unit of the pressing tool known from DE 10 2012 105 655 A1 is restricted to one operating direction, the pressing tool has to be rotated by 180° between the two pressing procedures before the second pressing sleeve can be pressed in the second operating direction. Therefore, the joining of fittings or sleeves having two pressing ends is laborious and time-intensive.

SUMMARY OF THE INVENTION

Proceeding from the prior art described above, the object of the present invention was to provide a pressing tool which does not show, or at least only shows to a limited extend the above disadvantages and which in particular allows in a simple manner to produce pipe connections in a more flexible and efficient way.

This object is achieved by a generic pressing tool which is, according to the invention, characterized in that the sliding means are movable towards the holding means along a second axial operating direction opposite the first axial operating direction to press two interengaging tubular or sleeve-shaped connection elements.

It has been found that a more flexible and efficient production of pipe joins can be achieved if the sliding means are capable of joining connection elements in two opposite operating directions in one alignment or orientation of the pressing tool. In this manner, contrary to previously known solutions, a laborious rotating procedure of the pressing tool and of a machine, which is possibly connected to the pressing tool, is no longer necessary when, for example, connection elements with two pressing ends which are to be joined axially are to be pressed.

Holding means for holding the periphery of at least one first tubular or sleeve-shaped connection element are provided on the pressing tool. For this purpose, the holding means can have clamping surfaces which are associated with a connection element, it being possible for said connection element to be clamped between the clamping surfaces. The clamping surfaces can be adapted to the periphery of the connection element so that the clamping surfaces fully engage around the periphery of the connection element, the clamping forces being transmitted in an extensive manner and as homogeneously as possible in a radial direction. Thus, the holding means can delimit, for example a substantially cylindrical passage opening for receiving and bracing or clamping an also substantially cylindrical connection element. In this respect, the diameter of the passage opening in the holding means is smaller in size compared to the diameter of the outer lateral surface of the cylindrical connection element. A connection element of this type to be held by the holding means can be, for example a sleeve-shaped base body of a fitting, onto which a pressing sleeve is to be pushed in an axial direction to produce a pipe connection.

During the clamping procedure, the clamping surfaces of the holding means can intrude into the outer lateral surface of the connection element or can plastically deform this outer lateral surface. In this case, the clamping surfaces engage radially in the material of the connection element, thereby forming a positive connection between the holding means and the connection element in an axial direction. Therefore, in the region of the holding means, a force-fit and a positive-fit connection can be produced between the holding means and the connection element to be held by the pressing tool in order to fix a connection element against displacement in an axial direction. For this purpose, the clamping surfaces can be profiled so that between the profiling and the outer lateral surface of the connection element, a plurality or large number of interengaging form elements can be formed which counteract an axial displacement of the connection element relative to the pressing tool.

The pressing tool has sliding means for peripherally holding and axially displacing at least one second tubular or sleeve-shaped connection element. A connection element of this type to be displaced can be a pressing sleeve which is associated with the aforementioned base body of a fitting and which, as stated in the introduction, is to be pushed in an axial direction onto this base body to radial press said base body. The internal diameter of a pressing sleeve of this type is tapered over the width thereof against the joining direction so that when the pressing sleeve is pressed on axially, the outer lateral surface of the base body is displaced radially inwards by the inner lateral surface of the pressing sleeve.

The sliding means can have clamping surfaces, facing a connection element, to receive and hold the connection element, said clamping surfaces being adapted in particular to the periphery of the connection element and, when two connection elements are being pressed, they rest substantially flush against the outer lateral surface of the associated connection element.

The sliding means can have a web which projects inwards in a radial direction to create a positive-fit contact with a planar side of the associated tubular or sleeve-shaped connection element in an axial direction. The pressing forces introduced manually or by machine into the pressing tool for axially displacing and (radially) pressing two tubular or sleeve-shaped connection elements can be transmitted via this web onto the connection elements held in the sliding means and holding means. The web can be, for example part of a groove provided in the region of an inner lateral surface of the holding means. During the pressing procedure, the connection element which is respectively associated with the sliding means is supported axially on the web against the respective operating direction, so that the web forms an axial stop for the connection element. Using the holding means and sliding means, it is possible in particular to fix tubular or sleeve-shaped connection elements, which are to be pressed, substantially coaxially to one another in the pressing tool before the actual pressing procedure.

An axial operating direction, along which according to the invention the sliding means are movable towards the holding means for pressing two interengaging tubular or sleeve-shaped connection elements is a direction in which, due to the movement of the sliding means, joining forces for producing an non-detachable pipe connection between the connection elements can be transmitted. Therefore, the pressing tool according to the invention comprises sliding means which provide an axial stroke working in opposite directions with two opposite operating or joining directions. Thus, with the pressing tool according to the invention, it is possible to carry out pressing procedures in opposite directions without changing the spatial orientation of the pressing tool. The axial operating directions particularly extend in opposite directions along a common axis.

Therefore, according to a first aspect, the invention relates to a pressing tool for producing an unreleasable pipe connection, comprising holding means for peripherally holding at least one first tubular or sleeve-shaped connection element and comprising sliding means for peripherally holding and axially displacing at least one second tubular or sleeve-shaped connection element, the sliding means being movable towards the holding means along a first axial operating direction to press two interengaging tubular or sleeve-shaped connection elements. The slide elements are movable towards the holding means along a second axial operating direction, opposite the first axial operating direction, to press two interengaging tubular or sleeve-shaped connection elements.

According to a first embodiment of the invention, the sliding means have at least one first slide unit and at least one second slide unit. The slide units are axially displaceable in opposite directions and are configured to cooperate with the holding means in opposite operating directions. Therefore, a respective slide unit serves one axial operating direction of the pressing tool during a pressing procedure. Subject to the required operating direction, the user can use either the first or the second slide unit for axially displacing an associated connection element, in particular a pressing sleeve, without having to change the spatial orientation of the pressing tool. In this respect, due to the axial positioning of the tool relative to a connection element, the user can fix the operating direction during the pressing procedure because, depending on the axial position of the pressing tool relative to the connection element, the first or second slide unit acts on the connection element.

According to a further embodiment of the pressing tool, the slide units are guided along at least one common axis, the slide units being arranged, in particular closely, next to one another in a starting position. The slide units can sit, for example on at least one common bolt. For this purpose, it is possible to provide in the slide units respective holes which receive the bolt. A bolt of this type can extend in particular substantially parallel to the axially opposing operating directions. In this case, the bolt forms a linear guidance, the slide units being formed to transmit joining forces onto the connection elements to be joined during the displacement of the slide units along this linear guidance in opposing operating directions. Consequently, the pressing tool can be of a compact construction and it is also possible for the degrees of freedom of the slide units to be easily defined by a linear guidance.

According to a further configuration of the pressing tool according to the invention, the slide units can be resiliently pretensioned against one another. In this respect, in a starting position, i.e., before a connection element has been received and before a pressing procedure has been initiated, the slide units can be braced resiliently against one another and they can sit centrally on a common axis. The position of the slide units inside the tool is defined thereby, so that a user can easily position the tool with repetition accuracy in the region of corresponding joins relative to a fitting or a sleeve.

According to a further configuration of the pressing tool in question, the holding means have a first holding unit and a second holding unit which is arranged at a distance from the first holding unit. The sliding means are arranged between the first holding unit and the second holding unit. The first holding unit is associated with the first axial operating direction and the second holding unit is associated with the second axial operating direction. When the connection elements are pressed in the respective axial operating direction, the respectively associated holding units form an abutment on which the connection element associated with the holding unit is supported against the connection element which is moved towards the holding unit by the sliding means. The movable parts of the slide units can be protected against environmental influences by arranging the sliding means between the holding means.

The previously described first and second slide units for example can be arranged between the two holding portions. In this case, the first slide unit is associated with the first holding unit, while the second slide unit is associated with the second holding unit. According to a further configuration of the pressing tool, a first spring unit is arranged between the first holding unit and the first slide unit and a second spring unit is arranged between the second holding unit and the second slide unit. The first and second slide units can be arranged substantially centrally between the holding units on at least one common axis. In this case, on the side remote from their operating direction, the respective slide units are braced or resiliently supported against the respective other slide unit and are braced or resiliently supported in their operating direction against the respectively associated holding unit via the respectively associated spring unit. The spring units ensure an automatic return of the slide units after a pressing procedure into a particularly substantially central starting position between the holding units. The position of the slide units between the holding units in a starting position is defined thereby, so that a user can easily position the tool with repetition accuracy in the region of corresponding joins relative to a fitting or a sleeve.

According to a further configuration of the pressing tool, the holding means and the sliding means are provided on swivel elements which can swivel transversely to the axial operating directions. In this respect, the holding means and the sliding means are formed at least in two parts on the mutually swivellable swivel elements. For example, the first and second holding means can be formed from mutually associated recesses in two swivel elements which, in a closed state of the swivel elements, form two cylindrical mounts for holding connection elements. Similarly, the first and second slide units can be formed from mutually associated half shells, a first half shell of one slide unit being arranged on a first swivel element and the second half shell of this slide unit being arranged on a second swivel element. Due to this configuration, the holding units and the slide units can be opened and closed by wiveled the swivel elements for a positioning of the connection elements in the pressing tool. The swivel axis, about which the swivel elements are wiveled relative to one another, extends in particular parallel to the axial operating directions. Each of the swivel elements can be mounted on a separate bolt or on a separate pin.

According to an embodiment of the pressing tool according to the invention, pressing means are provided for displacing the sliding means along the axial operating directions. The pressing means and the sliding means have mutually associated slide surfaces, the slide surfaces being configured to transform a movement of the pressing means transversely to the axial operating directions into an axial displacement of the sliding means. First slide surfaces are provided to move the sliding means in the first operating direction and second slide surfaces are provided to move the sliding means in the second operating direction. The necessary pressing forces can be introduced into the pressing tool by the pressing means at a distance from the sliding means, it being possible for actuating power to be increased or reduced by mechanical levers. It is thereby easily possible to introduce pressing forces or actuating power into the pressing tool using an external machine.

According to an advantageous further configuration, the pressing means of the pressing tool are provided on swivel elements which can swivel transversely to the axial operating directions. The swivel elements have in particular a receiving portion which faces the pressing means and extends as far as a swivel axis of the respective swivel element and an actuating portion which is remote from the pressing means and extends from the swivel axis. The actuating portions are used to introduce pressing forces into the pressing tool. The increase and decrease in actuating power and adjustment travel can be predetermined by the ratio of the lengths of the receiving portion and of the actuating portion.

The holding means, sliding means and pressing means can be configured at least in two parts, a first part being associated with a first swivel module and a second part being associated with a second swivel module of the pressing tool. Such a swivel module can be composed, for example, of two swivel elements which can swivel separately from one another about a common swivel axis. In this respect, the holding means and the sliding means can be formed on a first swivel element of such a swivel module and the pressing means can be formed on a second swivel element of such a swivel module. In this manner, the holding means and the sliding means can be wiveled and actuated via the first swivel elements of the swivel modules independently of the pressing means formed on the second swivel elements of the swivel modules. It is thereby possible, for example, in a two-stage joining procedure for the connection elements which are to be joined to be initially encompassed by the holding means and the sliding means and to be positioned substantially coaxially relative to one another, before the actual pressing procedure is initiated by actuating the pressing means and before the axial relative movement of the connection elements is produced by the sliding means.

According to a further embodiment of the invention, the pressing means have pressing portions which taper substantially in a wedge shape in the direction of the sliding means and on which the first and second slide surfaces of the pressing means are formed, the sliding means being arranged between the pressing portions and the pressing portions at least partly encompassing the sliding means transversely to the axial operating directions. Since a first and a second slide surface are provided on one pressing portion, on the one hand the pressing tool can be constructed in a compact manner. Furthermore, a wedge-shaped pressing portion of this type makes it possible to move two slide units apart in opposite directions, which slide units are arranged adjacently on one axis and are resiliently pretensioned against one another. Therefore, two slide units can be simultaneously displaced in opposite operating directions by the wedge-shaped pressing portion. In this case, actuating the pressing means synchronously triggers an axial stroke of the pressing tool in the first operating direction and in the second operating direction. Two connection elements to be joined can sit unilaterally in the region of the first slide unit to produce a pressed connection and can be arranged in the pressing tool at a distance from the respective other slide unit. During the pressing procedure of two connection elements by the first slide unit, the second slide unit simultaneously performs an "idle stroke" without contacting one of the connection elements or without acting thereon. Therefore, the user can determine the pressing direction just by the axial positioning of the connection elements relative to the pressing tool.

According to an embodiment of the pressing tool according to the invention, the holding means and/or the sliding means and/or the pressing means are configured to be substantially mirror-symmetrical with respect to a radial tool plane, the radial tool plane extending transversely to the axial operating directions. In particular, the radial tool plane can be formed substantially vertically to the axial operating directions. The symmetrical construction allows the pressing tool to be produced economically, because for example components of the holding means or sliding means, such as holding units or slide units which are opposite one another with respect to the plane of the tool can be configured identically.

According to a further configuration, the holding means and/or the sliding means and/or the pressing means of the pressing tool in question are configured to be substantially mirror-symmetrical with respect to an axial tool plane, the axial tool plane extending along the axial operating directions. In particular, the axial tool plane is oriented substantially parallel to the axial operating directions. As mentioned above, the production costs can be reduced by a symmetrical arrangement or formation of the components of the pressing tool. Furthermore, force can easily be introduced homogeneously into the connection elements to be joined. In addition to individual components, the entire pressing tool can be substantially mirror-symmetrical with respect to the mentioned planes of symmetry.

The holding means and/or the sliding means and/or the pressing means can be provided in the manner described above on swivel modules which can be wiveled transversely to the axial tool plane, in particular along or parallel to the radial tool plane. Thus, the pressing tool according to the invention can be formed from two substantially identical swivel modules which are respectively mounted on a bolt in a housing.

According to a second variant of the pressing tool according to the invention, the sliding means have at least one switchable slide unit which, in a first switch position, is movable into the first operating direction of the pressing tool and in the second switch position, is movable into the second operating direction of the pressing tool. Therefore, a single slide unit can perform an axial stroke in the first axial operating direction or in the second axial operating direction, subject to the respective position of the switch. In this case, the pressing tool can be of a particularly compact construction. A switch device can be provided, by means of which a user fixes the respective operating direction by switching between the first switch position and the second switch position for the pressing task to be performed. This configuration of the slide unit is particularly advantageous in assembly positions which are difficult to access or cannot be easily seen, where the user cannot determine, or can only determine with difficulty, the precise axial position of the tool relative to the connection elements. Thus, the operating direction of the sliding means is clearly predetermined by the switch function.

According to a further configuration of the above embodiment, the switchable slide unit sits on a bolt, the slide unit together with the bolt being displaceable along an axis of the bolt from the first switch position into the second switch position. Thus, by a simple movement of the bolt, in particular by a movement of the bolt between two end positions defined by stops, a user can predetermine the operating direction of the sliding means. The slide unit can be held resiliently pretensioned in a central starting position relative to the bolt. The position of the slide unit relative to the bolt is unambiguously defined both for the first switch position and for the second switch position by the starting position.

The object indicated above is also achieved according to the invention by a system for producing an non-detachable pipe connection, comprising a first connection element for receiving an end of a pipe to be connected, a second connection element which is associated with the first connection element and is configured to be axially pushed onto the first connection element, and a previously described pressing tool according to the invention for pressing the connection elements.

BRIEF DESCRIPTION OF THE DRAWINGS

In the following, the invention will be described in more detail with reference to drawing which illustrates embodiments. In the drawing.

DETAILED DESCRIPTION OF THE INVENTION

Figure 1:
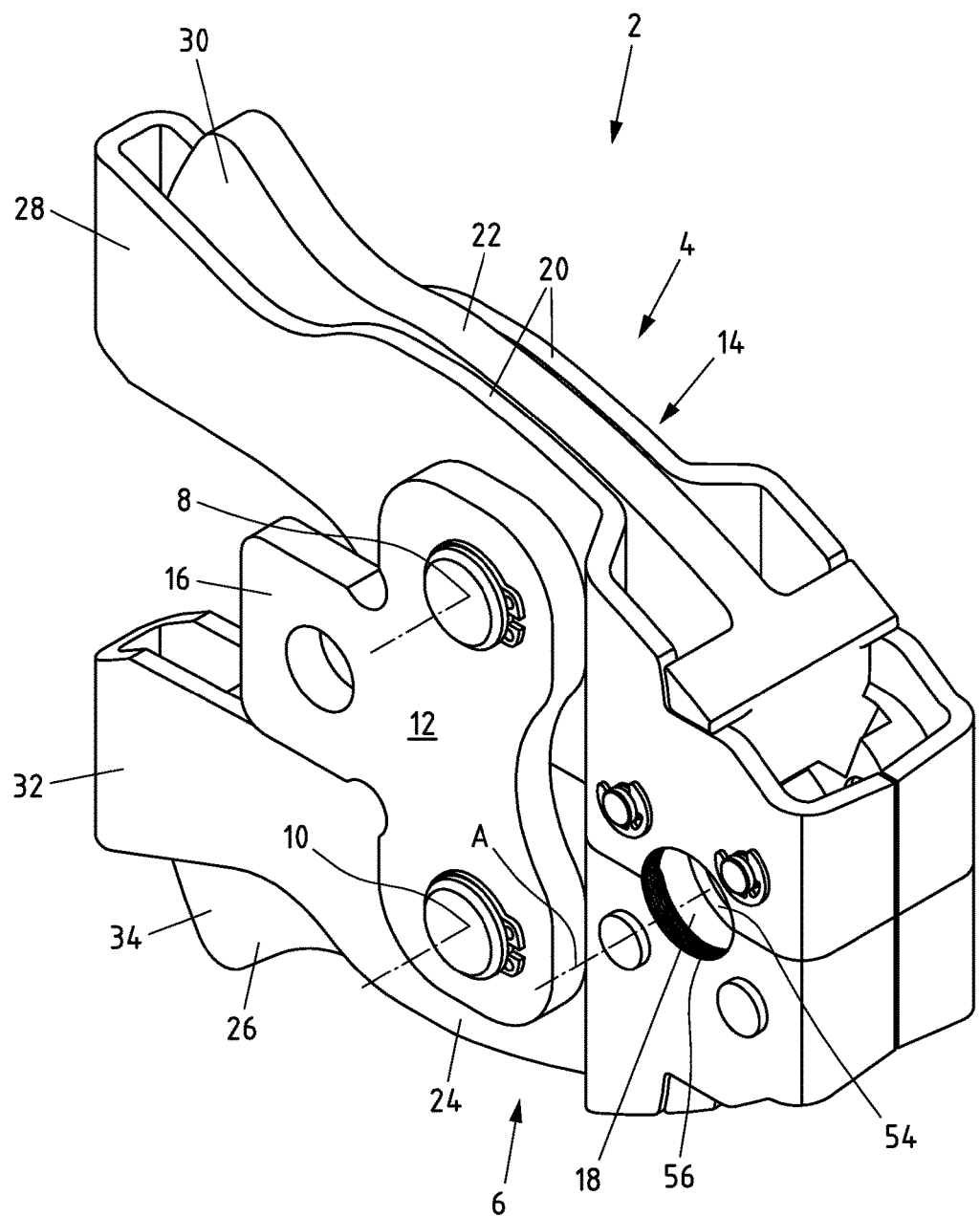
FIG. 1 is a perspective view of a pressing tool according to the invention in a closed state.

FIG. 1 is a perspective view of a pressing tool 2 according to the invention in a closed state. The pressing tool 2 is used to produce non-detachable pipe connections and has a first swivel module 4 and a second swivel module 6. The first swivel module 4 is mounted such that it can swivel about a first swivel axis 8 and the second swivel module 6 is mounted such that it can swivel about a second swivel axis 10. The swivel axes 8, 10 are arranged substantially parallel to one another and sit in holes in a first support element 12 and in a second support element 14 (hidden in FIG. 1) which is arranged opposite the first support element 12. The support elements 12, 14 have a respective coupling portion 16 for coupling a machine (not shown), said machine being used to actuate the pressing tool 2.

A receiving region 18 for receiving tubular or sleeve-shaped connection elements (not shown) is formed between the swivel modules 4, 6. In the closed state of the pressing tool 2 shown here, the receiving region 18 is a passage opening which is substantially cylindrical at least in portions. An axis A of the substantially cylindrical receiving region 18 is oriented substantially parallel to the swivel axes 8, 10. The swivel modules 4, 6 are in two parts. The first swivel module 4 has an outer swivel element 20 and an inner swivel element 22, the outer swivel element 20 encompassing the inner swivel element 22. The second swivel module 6 has an outer swivel element 24 and an inner swivel element 26, the outer swivel element 24 encompassing the inner swivel element 26.

The swivel elements 20, 22, 24, 26 have actuating portions 28, 30, 32, 34 on which actuating forces for swivelling the swivel modules 4, 6 or the swivel elements 20, 22, 24, 26 of the swivel modules 4, 6 are introduced when the pressing tool 2 is used. The swivel elements 20, 22 and 24, 26 associated with a respective swivel module 4, 6 are swivellable about their respective swivel axis 8, 10 separately from one another.

Figure 2A:
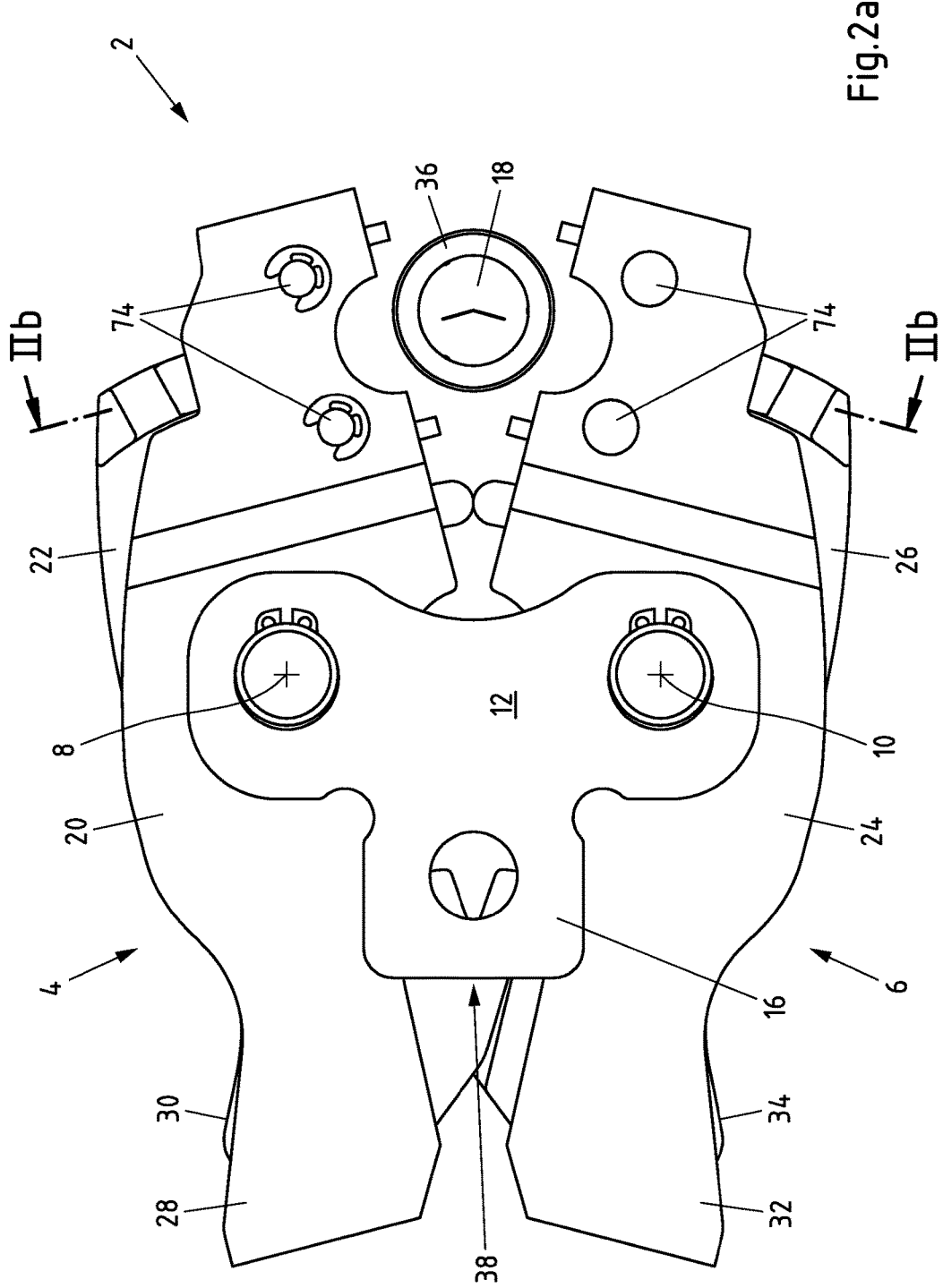
FIG. 2a is a side view of the pressing tool from FIG. 1 in an open state.

To position a fitting 36, to be pressed by the pressing tool 2, in the receiving region 18 of the pressing tool 2, the swivel modules 4, 6 are swivelled out of the closed position shown in FIG. 1 into the open position shown in FIG. 2a. For this purpose, the swivel elements 20, 22 and 24, 26 are pressed together in the region of their actuating portions 28, 30 and 32, 34. In their closed position, the swivel modules 4, 6 are pretensioned resiliently against one another about the swivel axes 8, 10 via a pretensioning mechanism 38 (not shown in detail), so that to transfer the swivel modules 4, 6 from the closed position into the open position, the pretension generated by the pretensioning mechanism 38 has to be overcome.

Figure 2B:
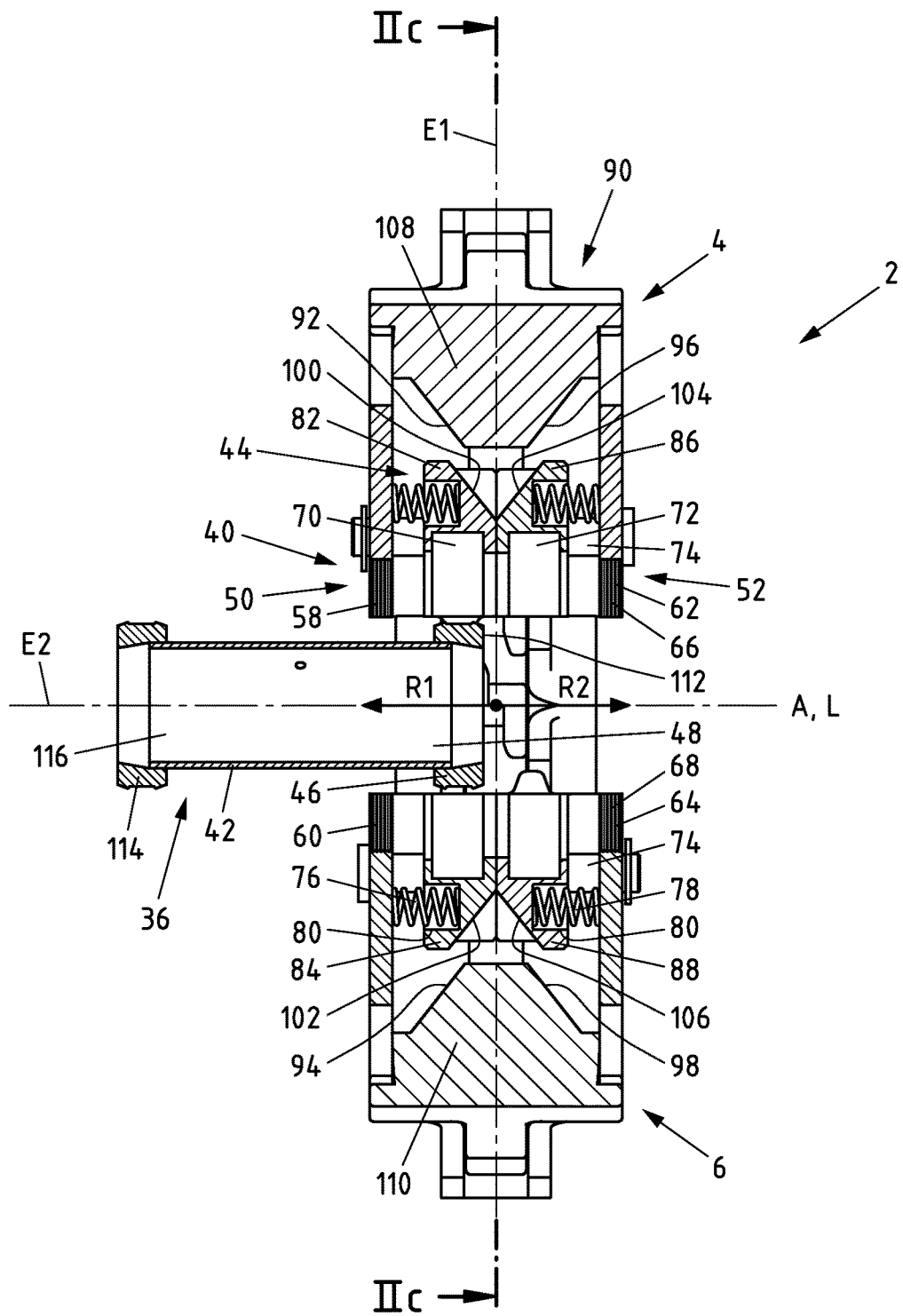
FIG. 2b is a sectional view of the pressing tool along line II-b from FIG. 2a, FIG. 2c is a sectional view of the pressing tool along line II-c from FIG. 2a, FIG. 3a is a side view of the pressing tool from FIG. 1 with closed holding means.

FIG. 2b is a sectional view of the pressing tool 2 along line II-b from FIG. 2a. The pressing tool 2 has holding means 40 which, in the embodiment shown here, are used to hold the periphery of a sleeve-shaped base body 42 of the fitting 36. The pressing tool 2 also has sliding means 44 for peripherally holding and axially displacing a pressing sleeve 46 of the fitting 36. The fitting 36 is positioned with its longitudinal axis L substantially coaxially to the axis A.

In a pre-assembled state shown in FIG. 2b, the pressing sleeve 46 sits on a first pressing end 48 of the base body 42 of the fitting 36. Therefore, the pressing sleeve 46 and the base body 42 engage in one another in the region of the first pressing end 48 of the fitting 36. To press the fitting 36 against a pipe end (not shown) sitting in the fitting 36, the sliding means 44 are movable towards the holding means 40 along a first axial operating direction R1. Furthermore, the sliding means 44 are movable towards the holding means 40 along a second axial operating direction R2 opposite the first axial operating direction R1 to press the fitting 36 against a further pipe end sitting in the fitting 36.

The holding means 40 have a first holding unit 50 and a second holding unit 52 which is arranged at a distance from the first holding unit 50 and is opposite said first holding unit 50. The first holding unit 50 is formed from a first recess 54 provided in the outer swivel element 20 of the first swivel module 4 and from a second recess 56 provided in the outer swivel element 24 of the second swivel module 6. The clamping surfaces 58, 60, facing the base body 42 of the fitting 36, of the recesses 54, 56 are profiled. The second holding unit 52 arranged opposite the first holding unit 50 is formed correspondingly from a first recess 62 provided in the outer swivel element 20 of the first swivel module 4 and from a second recess 64 provided in the outer swivel element 24 of the second swivel module 6. A respective profiling is also provided on the inner clamping surfaces 66, 68 of the recesses 62, 64. Consequently, the holding means 40 of the pressing tool 2 have two separate holding units 50, 52 which are spaced apart from one another in an axial direction along axis A. Each of these separate holding units 50, 52 is formed from a first recess 54, 62 associated with the first swivel module 4 and from a second recess 56, 64 associated with the second swivel module 6. The first holding unit 50 is associated with the first axial operating direction R1 and the second holding unit 52 is associated with the second axial operating direction R2.

The sliding means 44 are arranged between the first holding unit 50 and the second holding unit 52. The sliding means 44 have a first slide unit 70 and a second slide unit 72. The slide units 70, 72 are axially displaceable in opposite directions and are configured to cooperate with the holding means 40 in opposite operating directions R1, R2. The slide unit 70 is displaceable towards the first holding unit 50 along the first axial operating direction R1 from its starting position shown in FIG. 2b. The second slide unit 72 is displaceable towards the second holding unit 52 along the second axial operating direction R2 from its starting position shown in FIG. 2b. When a fitting arranged in the region of the respective slide unit 70, 72 is being pressed, the first slide unit 70 cooperates with the first holding unit 50 and the second slide unit 72 cooperates with the second holding unit 52.

Figure 2C:
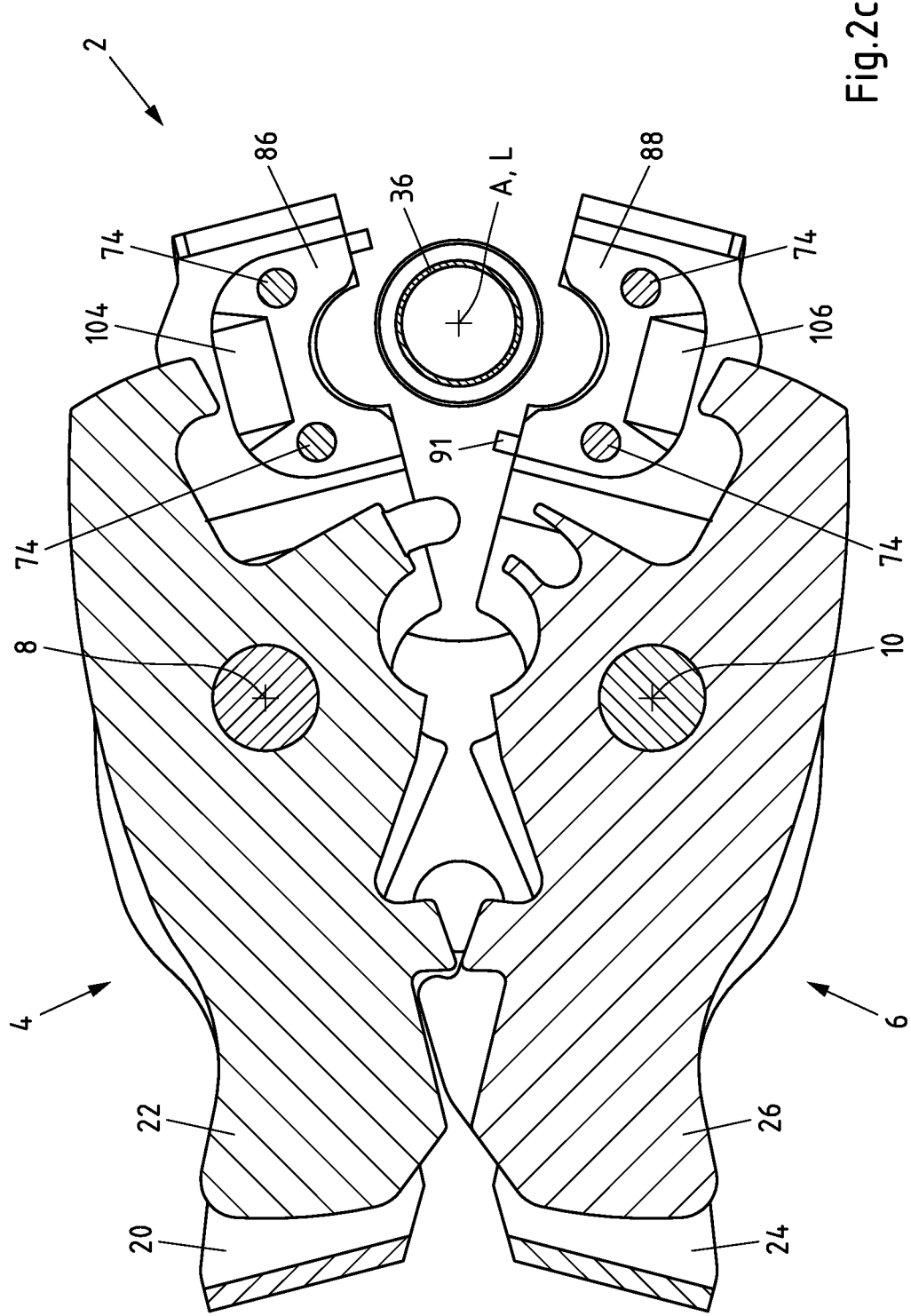

The slide units 70, 72 are slidably movable on bolts 74. In the starting position of the slide units 70, 72 shown in FIG. 2b, the slide units 70, 72 are arranged closely next to one another. In this respect, the slide units 70, 72 are pretensioned resiliently against one another. To generate the pretensioning forces, a first spring unit 76 is arranged between the first holding unit 50 and the first slide unit 70 and a second spring unit 78 is arranged between the second holding unit 54 and the second slide unit 72, said spring units 76, 80 having helical compression springs which are mounted in the recesses 80. The slide units 70, 72 each have two mutually associated half shells 82, 84, 86, 88. The first slide unit 70 is formed from the half shells 82 and 84, half shell 82 being arranged on the first swivel module 4 and half shell 84 being arranged on the second swivel module 6. The second slide unit 70 is formed from the half shells 86 and 88, half shell 86 being arranged on the first swivel module 4 and half shell 88 being arranged on the second swivel module 6. In the closed state, the mutually associated half shells 82, 84, 86, 88 have interengaging form elements 91, a respective projection engaging in a recess to fix the axial position of the respective half shells 82, 84, 86, 88 relative to one another in the closed state of the pressing tool 2. As can be seen in FIG. 2c, each of the half shells 82, 84, 86, 88 is held on two bolts 74 such that it is slidably movable thereon.

As shown in FIG. 2b, pressing means 90 for displacing the sliding means 44 along the axial operating directions R1, R2 are provided on the pressing tool 2. The pressing means 90 and the sliding means 44 have mutually associated slide surfaces 92, 94, 96, 98, 100, 102, 104, 106, the slide surfaces 92, 94, 96, 98 of the pressing means 90 being formed on pressing portions 108, 110 which taper in a wedge shape. The slide surfaces 100, 102, 104, 106 are provided on mutually facing regions of the slide units 70, 72, the mutually associated slide surfaces 100, 102, 104, 106 of the slide units 70, 72 delimiting wedge-shaped recesses in the starting position of the slide units 70, 72. The slide surfaces 92, 94, 96, 98, 100, 102, 104, 106 produce a transformation of a radial movement, i.e., transverse to the axial operating directions R1, R2 of the pressing means 90, into an axial displacement of the slide elements 70, 72. In this respect, the slide surfaces 92, 94 are used to axially displace the first slide unit 70 towards the holding unit 50 and the slide surfaces 96, 98 are used to axially displace the second slide unit 72 towards the holding unit 52. The pressing portions 108, 110 are provided on the swivel elements 22, 26 of the swivel modules 4, 6, the slide units 70, 72 being arranged between the pressing portions 108, 110. Therefore, a swivelling movement of the swivel elements 22, 26 results in a radial movement of the pressing portions 108, 110 relative to the slide units 70, 72.

FIG. 2c is a sectional view of the pressing tool 2 along line II-c from FIG. 2a to particularly emphasize the inclined surfaces 104, 106 and the shape of the half shells 86, 88 of the second holding unit 52.

Figure 3A:
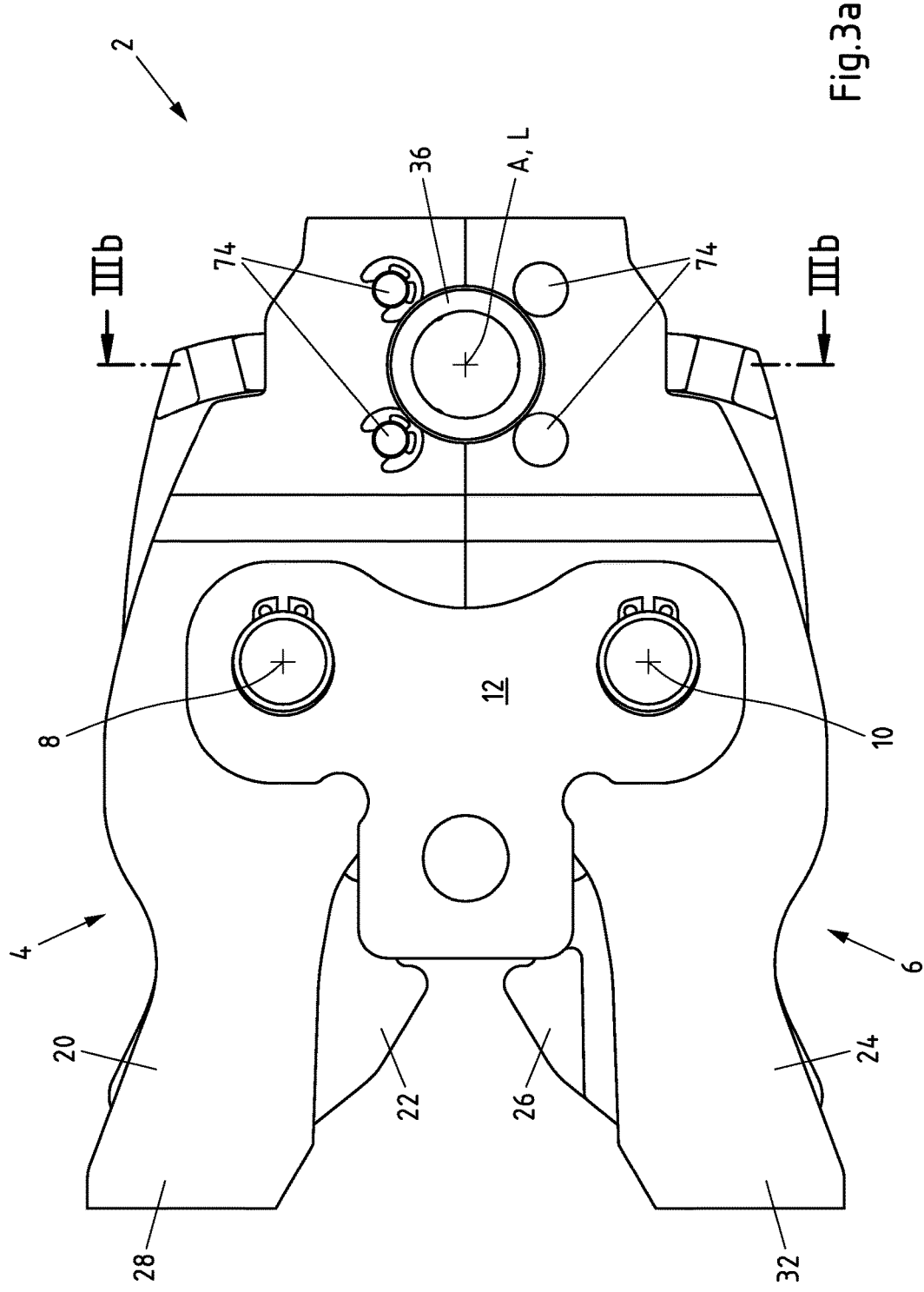
FIG. 3b is a sectional view of the pressing tool along line III-b from FIG. 3a, FIG. 4a is a side view of the pressing tool from FIG. 1 in a closed state.

FIG. 3a is a side view of the pressing tool 2 from FIG. 1 with closed holding means 40. To transfer the holding units 50, 52 of the holding means 40 from the open position shown in FIG. 2b into the closed position shown in FIG. 3a, the outer swivel elements 20, 24 have been swivelled about their respective swivel axes 8, 10 towards the fitting 36. For this purpose, the outer swivel elements 20, 24 have been spread apart or pushed apart by a machine (not shown) in the region of their actuating portions 28, 32.

FIG. 3b is a sectional view of the pressing tool 2 along line III-b from FIG. 3a. The first holding unit 50 engages around the periphery of the base body 42 of the fitting 36. In this respect, the clamping surfaces 58, 60 of the holding unit 50 are used to fix in a force fit and positive fit the base body 42 of the fitting 36 both in the axial direction and in the radial direction. The positive locking, acting against an axial displacement, between the pressing tool 2 and the fitting 36 is generated by the profiling of the clamping surfaces 58, 60, the radially inwardly facing webs of the profiling producing a plastic deformation in the region of the outer lateral surface of the base body 42 facing the clamping surfaces 58, 60 of holding unit 50.

The pressing sleeve 46 which is to be pushed onto the base body 42 in the region of the pressing end 48 is received peripherally and in the region of its end-face planar surfaces by the half shells 82, 84 of the first slide unit 70. For this purpose, a groove is formed in each of the half shells 82, 84. The slide surfaces 92, 94, 96, 98 of the pressing portions 108, 110 and the slide surfaces 100, 102, 104, 106 of the slide units 70, 72 are arranged at a distance from one another so that in this state of the pressing tool 2, no pressing forces are transmitted onto the sliding means 44 from the pressing means 90. The position, shown here, of the swivel elements 20, 22, 24, 26 describes the fixing and orientation of the connection elements to be joined of the base body 42 and of the pressing sleeve 46 inside the pressing tool 2 immediately before the actual pressing procedure.

Figure 4A:
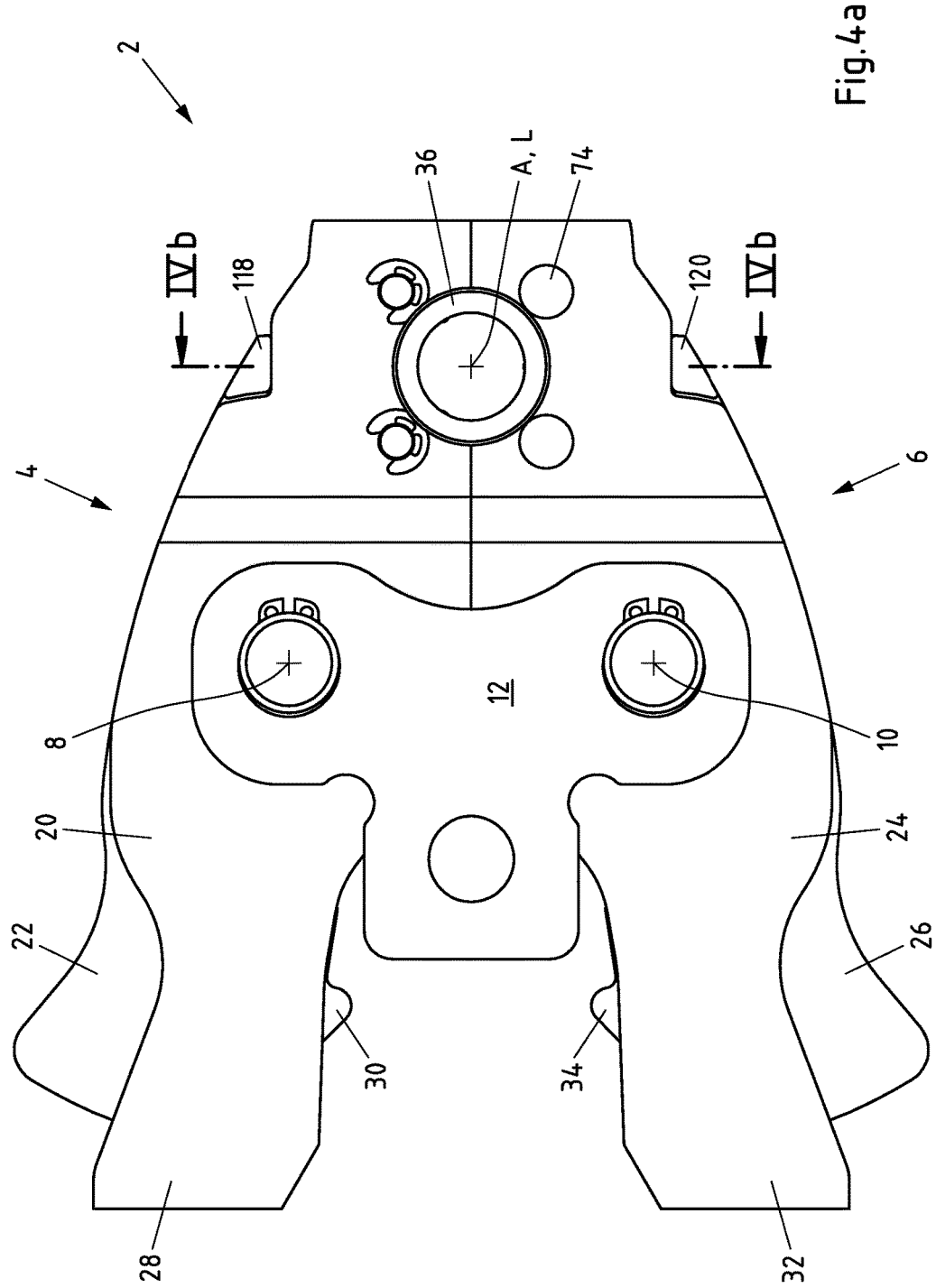
FIG. 4b is a sectional view of the pressing tool along line IV-b from FIG. 4a, FIG. 5a is a perspective view of a further pressing tool according to the invention in a closed state.

FIG. 4a is a side view of the pressing tool 2 in the closed state. In addition to the outer swivel elements 20, 24 of the swivel modules 4, 6, the inner swivel elements 22, 26 of the swivel modules 4, 6 have also been pressed apart by a machine (not shown) in the region of their actuating portions 30, 34. Consequently, the pressing tool 2 is in a fully closed state, as has already been shown for the pressing tool 2 in FIG. 1 without the fitting 36 to be pressed.

Figure 4B:
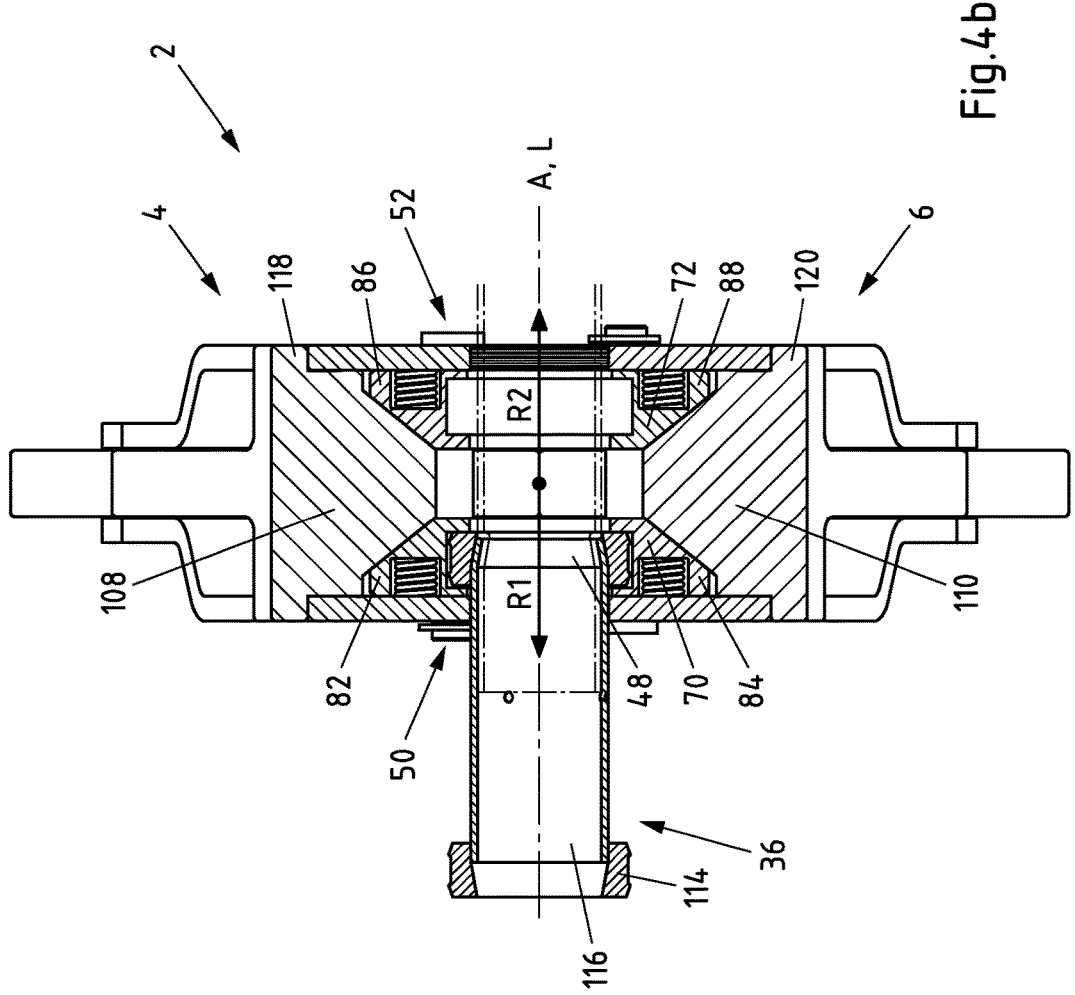

FIG. 4b is a sectional view of the pressing tool 2 along line IV-b from FIG. 4a. The first slide unit 70 and the second slide unit 72 have been moved on the bolt 74 along the respectively associated axial operating directions R1, R2 out of their central starting position towards the holding units 50, 52 by the radially inwardly directed swivelling movement of the pressing portions 108, 110. In this respect, the radially inwardly directed movement of the pressing portions 108, 110 has been transformed into an axial movement of the slide units 70, 72 along the axis A by a sliding movement of the slide units 70, 72 along the slide surfaces 92, 94, 96, 98, 100, 102, 104, 106. In this respect, the slide units 70, 72 have been synchronously displaced outwards from the central starting position by the pressing portions 108, 110. The pressing sleeve 46 has been pushed onto the base body 42 of the fitting 36, fixed in the holding unit 50, in the first axial operating direction R1 along axis A by the displacement of the slide unit 70. During the axial displacement, the diameter, tapered in a direction remote from the base body 42, of the pressing sleeve 46 produces a radially inwardly directed deforming of the base body 42 in the region of the pressing end 48. In this way, the fitting 36 can be pressed with a pipe which has been received in the fitting, the pipe being shown by the dash-dot line in FIG. 4b. The edge of the base body 42 in the region of the pressing end is then beaded radially inwards and penetrates into the wall of the pipe.

It is also possible with the present pressing tool 2 to push a second pressing sleeve 114 onto the base body 42 of the fitting 36 in the region of a second pressing end 116, in which case only the axial position of the pressing tool 2 relative to the fitting 36 has to be changed, while the orientation, i.e. the angular position, of the pressing tool 2 relative to the fitting 36 can be maintained. Thus, after the pressing sleeve 46 has been pressed, the pressing tool 2 can be positioned with the second slide unit 72 over the second pressing sleeve 114 so that the pressing sleeve 114 is received by the second slide unit 72 and the base body 42 of the fitting 36 is fixed in the pressing tool 2 by means of the second holding unit 52. The pressing procedure for joining a second pipe end, received in the fitting 36, of a second pipe (not shown) can then be carried out in the region of the second pressing end 116 analogously to the pressing procedure described above.

To avoid a deformation or widening of the outer swivel elements 20, 24 of the swivel modules 4, 6, the stops 118, 120 are provided on the pressing portions 108, 110 which stops 118, 120 also restrict the outwardly directed axial stroke of the slide units 70, 72 by restricting the axially inwardly directed swivel path of the inner swivel elements 22, 26 during the pressing procedure.

Figure 5A:
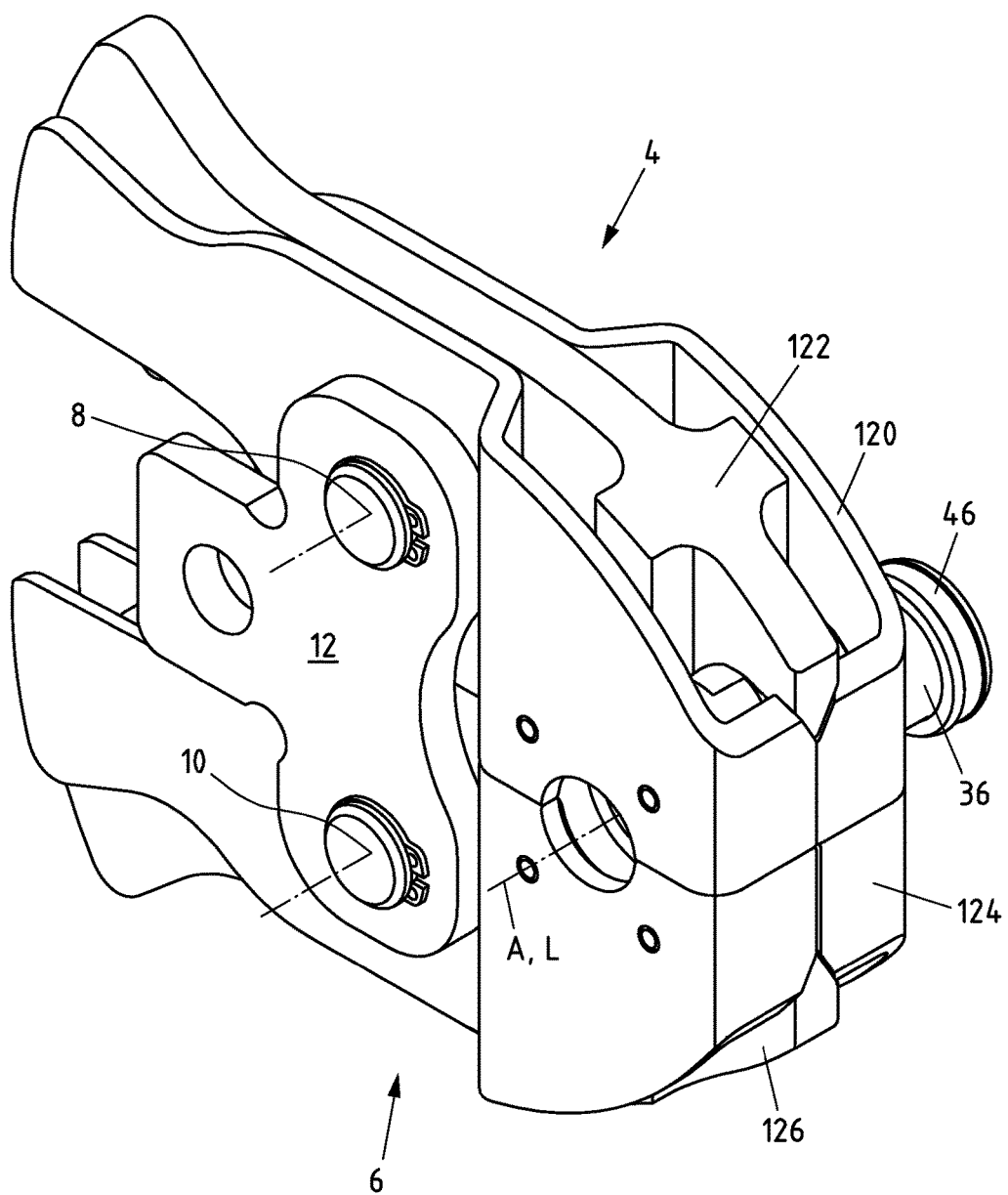
FIG. 5b is a sectional view of the pressing tool along line V-b from FIG. 5a, FIG. 6a is a partial sectional view of a further pressing tool having a switchable slide in a first switch position according to the invention.
Figure 5B:
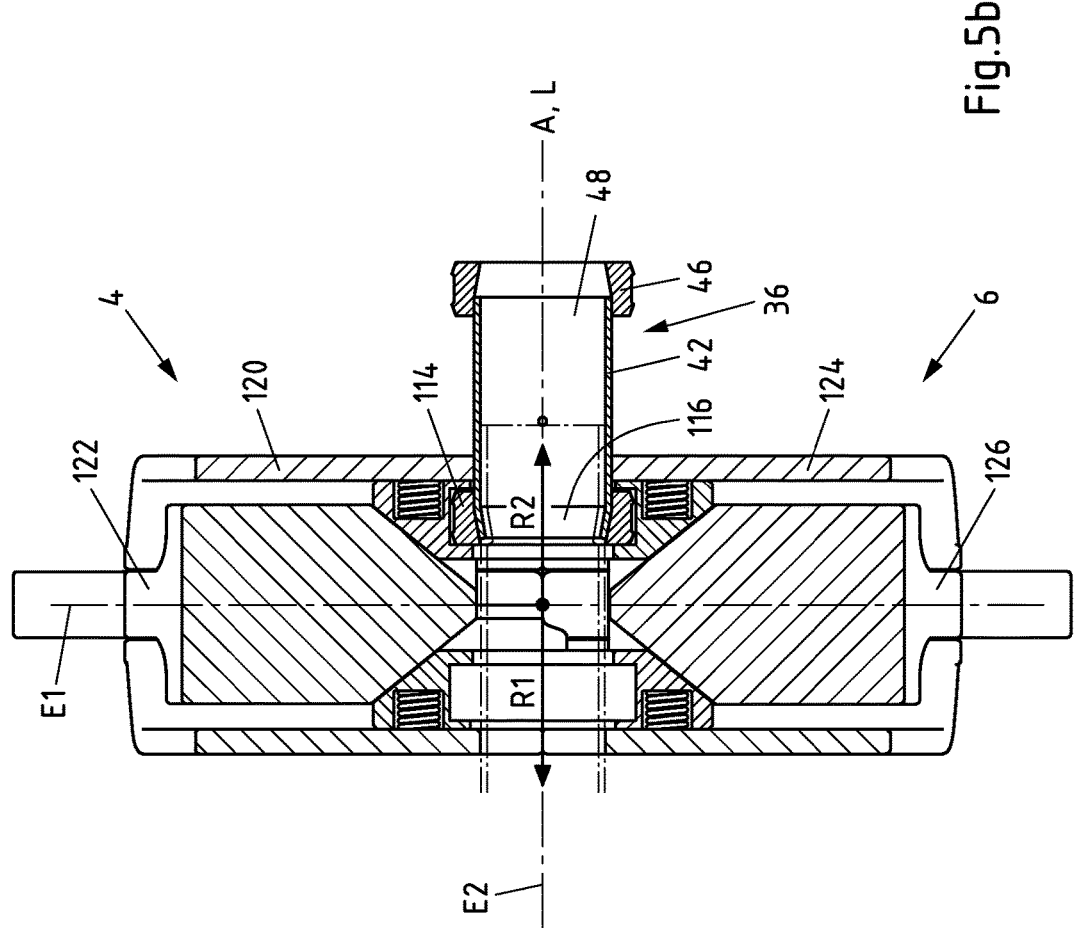

In a further embodiment of a pressing tool 118 according to the invention, it is also conceivable to dispense with means of this type for restricting the axial stroke, as shown in FIGS. 5a and 5b, wherein the same reference numerals have been assigned to the same components compared to the previous figures. Overall, the pressing tool 118 shown in FIG. 5 differs from the embodiment described above in that it does not have the above-described stops 118, 120. Thus only the swivel elements 120, 122, 124, 126 differ from the components described with reference to the first embodiment.

The previously described pressing tools 2 and 118 are each configured substantially mirror-symmetrically to the planes E1 and E2.

Figure 6A:
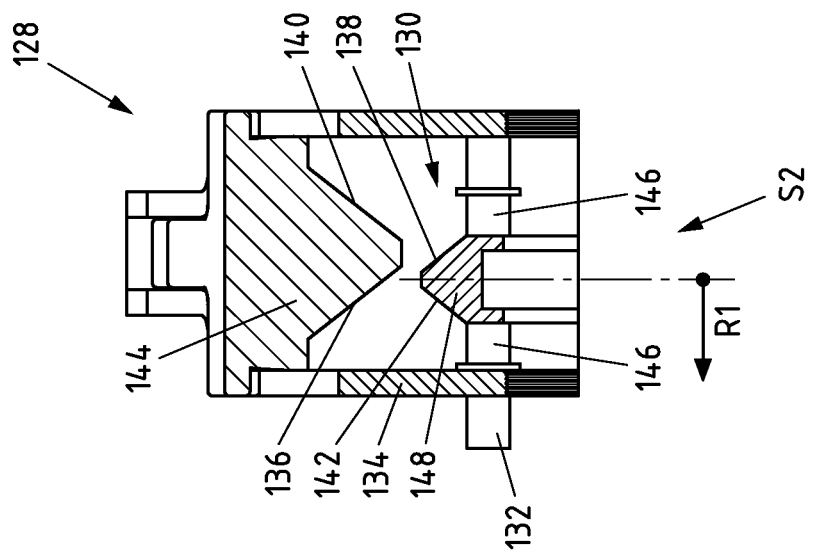
FIG. 6b is a partial sectional view of the pressing tool from FIG. 6a with the switchable slide in a second switch position.
Figure 6B:
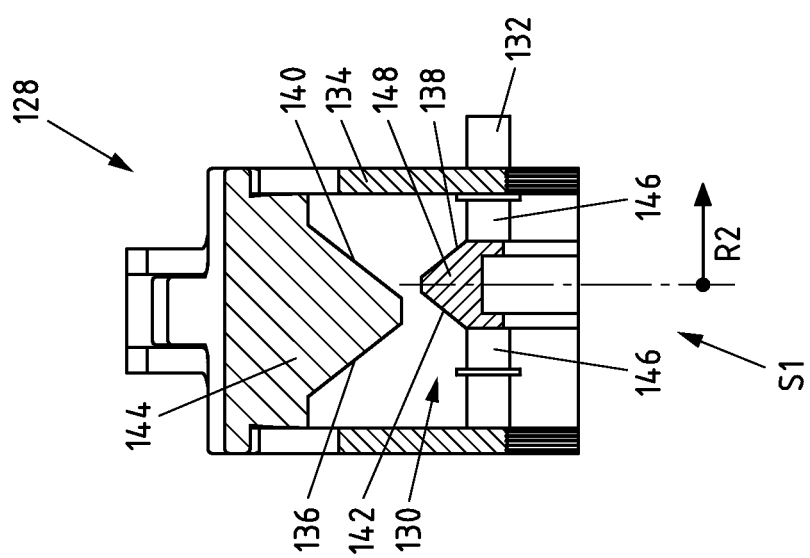

FIGS. 6a and 6b show a quarter sectional view of a further pressing tool 128 according to the invention. The pressing tool 128 has a switchable slide unit 130 which is movable together with the bolt 132 between a first switch position S1, as shown in FIG. 6a and a second switch position S2, as shown in FIG. 6b. In the respective switch position, the bolt 132 can be locked by a locking device (not shown) relative to the swivel element 134. Subject to the selected switch position S1, S2, as the pressing tool 128 closes the first or the second slide surfaces 136, 138, 140, 142 of pressing portion 144 and slide unit 130 cooperate to move the slide unit 130 in the respectively associated operating direction R1, R2. The slide unit 130 is held, pretensioned, on the bolt 132 in a central position by spring units 146 (not shown). The first half shell 148 of the slide unit 130 can entrain a second half shell (not shown) of the slide unit by form elements or coupling elements between the respective switch positions S1, S2.

The invention claimed is:

1. A pressing tool for producing a non-detachable pipe connection, comprising:
a holding element for holding a periphery of at least one first tubular or sleeve-shaped connection element and
a sliding element for peripherally holding and axially displacing at least one second tubular or sleeve-shaped connection element,
wherein the sliding element is movable along a first axial operating direction toward the holding element to press two interengaging tubular or sleeve-shaped connection elements,
wherein the sliding element is movable toward the holding element along a second axial operating direction opposite the first axial operating direction to press two interengaging tubular or sleeve-shaped connection elements,
wherein the sliding element has at least one first slide unit and at least one second slide unit,
wherein the slide units are axially displaceable in opposite directions and are configured to slide relative the holding element in opposite operating directions,
wherein the slide units are guided along at least one common axis, and
wherein the slide units are arranged next to each other in a starting position.

2. The pressing tool according to claim 1, wherein the slide units are pretensioned resiliently against one another.

3. The pressing tool according to claim 1,
wherein the holding element has a first holding unit and a second holding unit which is arranged at a distance from the first holding unit,
wherein the sliding element is arranged between the first holding unit and the second holding unit, and
wherein the first holding unit is configured to prevent movement of the at least one first tubular or sleeve-shaped connection element in the first axial operating direction and the second holding unit is configured to prevent movement of the at least one first tubular or sleeve-shaped connection element in the second axial operating direction.

4. The pressing tool according to claim 3,
wherein a first spring unit is arranged between the first holding unit and the first slide unit, and
wherein a second spring unit is arranged between the second holding unit and the second slide unit.

5. The pressing tool according to claim 1, further comprising:
at least one swivel element configured to swivel transversely to the axial operating directions,
wherein the holding element and the sliding element are provided on the at least one swivel element.

6. The pressing tool according to claim 1, wherein
wherein a pressing element is provided for displacing the sliding element along the axial operating directions, wherein
wherein the pressing element and the sliding element have mutually associated slide surfaces, and wherein
wherein the slide surfaces are configured to transform a movement of the pressing element transversely to the axial operating directions into an axial displacement of the sliding element, and
wherein first slide surfaces are provided to displace the sliding element in the first axial operating direction and second slide surfaces are provided to displace the sliding element in the second axial operating direction.

7. The pressing tool according to claim 6, further comprising:
at least one swivel element configured to swivel transversely to the axial operating directions,
wherein the pressing element is provided on the at least one swivel element.

8. The pressing tool according to claim 6,
wherein the pressing element has pressing portions which taper in a wedge shape in a direction of the sliding element and on which the first and second slide surfaces of the pressing element are formed,
wherein the sliding element is arranged between the pressing portions, and
wherein the pressing portions at least partly encompass the sliding element in a plane transverse to the axial operating directions.

9. The pressing tool according to claim 1,
wherein at least one of the holding element, the sliding element, or the pressing element are configured to be mirror-symmetrical with respect to a radial tool plane, and
wherein the radial tool plane extends transversely to the axial operating directions.

10. The pressing tool according to claim 1, wherein
at least one of the holding element, the sliding element, or the pressing element are configured to be mirror-symmetrical with respect to an axial tool plane, and
wherein the axial tool plane extends along the axial operating directions.

11. A pressing tool for producing a non-detachable pipe connection, comprising:
a holding element for holding a periphery of at least one first tubular or sleeve-shaped connection element and
a sliding element for peripherally holding and axially displacing at least one second tubular or sleeve-shaped connection element,
wherein the sliding element is movable along a first axial operating direction parallel to an axis of the connection element toward the holding element to press two interengaging tubular or sleeve-shaped connection elements,
wherein the sliding element is movable toward the holding element along a second axial operating direction opposite the first axial operating direction to press two interengaging tubular or sleeve-shaped connection elements,
wherein the sliding element has at least one switchable slide unit, and
wherein the slide unit is, in a first switch position, movable into the first axial operating direction of the pressing tool and, in a second switch position, is movable into the second axial operating direction of the pressing tool.

12. The pressing tool according to claim 11,
wherein the switchable slide unit sits on at least one bolt, and
wherein the slide unit together with the bolt are movable out of the first switch position and into the second switch position.

13. A system for producing a non-detachable pipe connection, comprising:
a first connection element for receiving an end of a pipe to be connected,
a second connection element associated with the first connection element and configured to be axially pushed onto the first connection element, and
a pressing tool for pressing the connection elements,
wherein the pressing tool is configured according to claim 1.

* * * * *

UNITED STATES PATENT AND TRADEMARK OFFICE
CERTIFICATE OF CORRECTION

PATENT NO. : 10,442,064 B2
APPLICATION NO. : 14/937176
DATED : October 15, 2019
INVENTOR(S) : Frank Hofmann Page 1 of 1

It is certified that error appears in the above-identified patent and that said Letters Patent is hereby corrected as shown below:

In the Claims

Column 13, Lines 62-63, Claim 6, delete "wherein wherein" and insert -- wherein --

Column 13, Lines 65-66, Claim 6, delete "wherein wherein" and insert -- wherein --

Columns 13-14, Lines 67-1, Claim 6, delete "wherein wherein" and insert -- wherein --

Signed and Sealed this
Fourteenth Day of January, 2020

Andrei Iancu
*Director of the United States Patent and Trademark Office*